US008311599B2

(12) United States Patent
Hikino

(10) Patent No.: US 8,311,599 B2
(45) Date of Patent: Nov. 13, 2012

(54) SHORT-SIDE DIRECTION SLIDE TYPE RADIO APPARATUS

(75) Inventor: Nozomu Hikino, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 325 days.

(21) Appl. No.: 12/678,302

(22) PCT Filed: Jul. 9, 2009

(86) PCT No.: PCT/JP2009/062511
§ 371 (c)(1),
(2), (4) Date: Mar. 16, 2010

(87) PCT Pub. No.: WO2010/007932
PCT Pub. Date: Jan. 21, 2010

(65) Prior Publication Data
US 2010/0203930 A1 Aug. 12, 2010

(30) Foreign Application Priority Data
Jul. 17, 2008 (JP) .................................. 2008-186207

(51) Int. Cl.
H04M 1/00 (2006.01)
(52) U.S. Cl. ............... 455/575.4; 455/575.7; 455/575.1; 455/562.1; 343/702; 361/730
(58) Field of Classification Search ............... 455/575.4, 455/575.7, 550.1, 566, 575.8, 90.3, 66.1, 455/575.3, 562.1, 575.5; 361/814, 818, 679, 361/680, 681, 730, 683, 679.1; 343/702, 343/767, 895, 725; 345/168, 169, 173
See application file for complete search history.

(56) References Cited

U.S. PATENT DOCUMENTS

| 6,366,247 | B1* | 4/2002 | Sawamura et al. ........... 343/702 |
| 7,283,098 | B2* | 10/2007 | Lim .............................. 343/702 |
| 7,796,402 | B2* | 9/2010 | Mizoguchi et al. ........... 361/814 |
| 8,060,166 | B2* | 11/2011 | Kato et al. ................... 455/575.4 |
| 2005/0250532 | A1* | 11/2005 | Hwang et al. ............... 455/550.1 |
| 2005/0264457 | A1* | 12/2005 | Shin et al. ..................... 343/702 |
| 2006/0097933 | A1* | 5/2006 | Lee .............................. 343/702 |
| 2007/0004477 | A1* | 1/2007 | Kim .......................... 455/575.4 |

(Continued)

FOREIGN PATENT DOCUMENTS
JP 2001-309027 A 11/2001
(Continued)

Primary Examiner — Tan Trinh
(74) Attorney, Agent, or Firm — Birch, Stewart, Kolasch & Birch, LLP

(57) ABSTRACT

At a side end section of a second housing 3, there are provided an antenna 9 arranged along the short-side direction of the housing, a first housing 1, a slide mechanism section S which connects the first housing to the second housing slidably relative to each other in the short-side direction of the housing, and joining sections 31 to 34 which connect the slide mechanism section S to the second housing. The slide mechanism section is configured so that a large slide plate 17 and a small slide plate 15 are arranged in this order from the first housing between the first and second housings, so as to slide relative to each other. Further, in the direction intersecting the sliding direction, the joining sections are arranged, and reactance elements 41 to 44 are arranged at the same positions as those of the joining sections in the surface of the housing.

16 Claims, 6 Drawing Sheets

U.S. PATENT DOCUMENTS

| | | | |
|---|---|---|---|
| 2007/0087596 A1* | 4/2007 | Chung et al. | 439/131 |
| 2007/0120750 A1* | 5/2007 | Kim et al. | 343/702 |
| 2007/0126644 A1* | 6/2007 | Kim et al. | 343/702 |
| 2007/0128904 A1* | 6/2007 | Kang et al. | 439/159 |
| 2007/0225053 A1* | 9/2007 | Iwai et al. | 455/575.7 |
| 2007/0243912 A1* | 10/2007 | Lee et al. | 455/575.4 |
| 2008/0039157 A1* | 2/2008 | Park | 455/575.1 |
| 2008/0064453 A1* | 3/2008 | Park et al. | 455/575.3 |
| 2008/0099969 A1* | 5/2008 | Kim et al. | 267/167 |
| 2008/0158847 A1* | 7/2008 | Mizoguchi et al. | 361/814 |
| 2008/0261666 A1* | 10/2008 | Niitsu et al. | 455/575.4 |
| 2009/0033563 A1* | 2/2009 | Kanasaki et al. | 343/702 |
| 2009/0067138 A1* | 3/2009 | Oliver et al. | 361/730 |
| 2009/0262028 A1* | 10/2009 | Mumbru et al. | 343/702 |
| 2011/0009170 A1* | 1/2011 | Xiao | 455/566 |

FOREIGN PATENT DOCUMENTS

| | | |
|---|---|---|
| JP | 2006-203806 A | 8/2006 |
| JP | 2006-325098 A | 11/2006 |
| JP | 2007-201918 A | 8/2007 |
| JP | 2008-22139 A | 1/2008 |
| JP | 2008-131516 A | 6/2008 |
| WO | WO 2008/053610 A1 | 5/2008 |

* cited by examiner

FIG. 3
| Connection state | Polarized wave | Gain values (dBi) | | |
|---|---|---|---|---|
| | | 1.9GHz | 2.05GHz | 2.2GHz |
| Short-circuited connection | Vertical | −9.4 | −11.8 | −6.5 |
| | Horizontal | −5.6 | −5.9 | −7.3 |
| Loaded connection | Vertical | −7.6 | −6.2 | −4.8 |
| | Horizontal | −4.7 | −4.5 | −4.3 |
FIG. 4
(a)
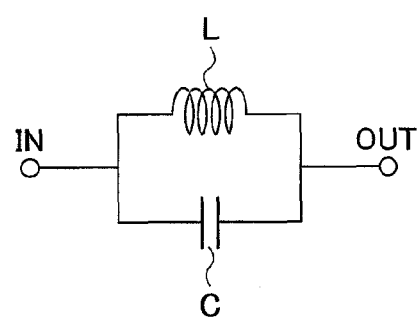
(b)
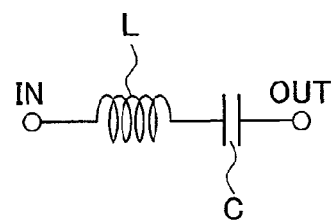

| Connection state | Reactance element | Gain values of vertically polarized wave (dBi) | |
|---|---|---|---|
| | | 900MHz | 2GHz |
| 1) | 4.0pF | −7.0 | −11.8 |
| 2) | 1.5nH | −10.5 | −6.8 |
| 3) | Filter configuration | −7.3 | −7.0 |

SHORT-SIDE DIRECTION SLIDE TYPE RADIO APPARATUS

BACKGROUND OF THE INVENTION

1. Field of the Invention

The present invention relates to a radio apparatus which is slidably opened and closed in the short-side direction of a housing, and more particularly to a technique to improve the communication characteristics of the radio apparatus.

2. Description of the Related Art

Through the development and improvement of portable communication networks in recent years, large capacity and high-speed data communication has been made possible. As a result, in addition to the telephone-based methods, the PC (Personal Computer) based methods have been increased as the methods of using radio apparatuses, such as a portable radio apparatus (terminal). Along with the diversification of utilization forms of the portable radio apparatus, the shape of the portable radio apparatus itself has also been diversified. As a result, along with the conventional foldable type and the slide type (expressed as long-side direction slide type in this specification for convenience of explanation), a radio apparatus (expressed as short-side direction slide type in this specification for convenience of explanation) which has an easily usable large and wide screen (lateral display), and which has first and second housings configured to be slidably opened and closed in the short-side direction of the housing, has been attracting attention.

In general, when a high frequency signal is supplied to an antenna attached to the small housing, induced current is generated in the vicinity of the antenna of the second housing at which the antenna is arranged. In the case where the first housing is connected to the second housing in a state equivalent to a short-circuit state, induced current is also generated in the first housing similarly to the second housing, and these induced currents contribute to the radiation characteristics of the antenna.

At present, the frequency band mainly used in the radio apparatus is, in many cases, a frequency band corresponding to a wavelength, about one fourth of which ($\lambda/4$) is the short-side direction length of the housing, and the above described induced current is generated so as to flow in the direction of $\lambda/4$ which is the resonance length of the induced current, that is, in the short-side direction of the housing. It is possible to obtain excellent antenna characteristics by controlling the induced current generated on the housing.

For example, a technique relating to the improvement of antenna characteristics of a long-side direction slide type portable radio apparatus is disclosed in Patent Document 1 as will be described below. According to Patent Document 1, it is possible to widen the frequency band of the antenna and to control the radiation pattern of the antenna. However, since the load connected to widen the band is inductive, and since the load connected to control the radiation pattern is capacitive, the reactance constants of the connected loads need to be different from each other. For this reason, both the purpose of widening the band of the antenna and the purpose of controlling the radiation pattern are difficult to be realized in the same frequency band.

Further, Patent Document 2 as will be described below discloses a technique for improving antenna characteristics of a small and thin long-side direction slide type apparatus in a free space. However, Patent Document 2 originally proposes a new technique for solving the problem that the antenna characteristics cannot be secured.

Patent Document 1: JP Patent Publication (Kokai) No. 2006-203806
Patent Document 2: JP Patent Publication (Kokai) No. 2006-325098

SUMMARY OF THE INVENTION

Problems to be Solved by the Invention

In a portable radio apparatus in which a first housing and a second housing are slidably opened and closed in the short-side direction of the housing, in the case where the antenna feeding point is arranged at a sliding direction end section of the housing at which the antenna is arranged, the communication quality is deteriorated at the time when the housings are slidably opened. This problem will be described below.

When electric power is supplied to the antenna, the above described induced current is generated in the second housing at which the antenna is arranged. The induced current flows from the antenna feeding point toward the other end section along the short-side direction of the housing having the length of about $\lambda/4$ which is the resonance length.

On the other hand, induced current is also generated on the side of the first housing similarly to the second housing. This induced current flows from the side of the antenna feeding point toward the other end section along the short-side direction of the housing, similarly to the induced current generated on the side of the second housing.

Here, the induced currents generated in the first housing and the second housing are currents which flow in the directions opposite to each other from the feeding point as the center in the state where the housings are opened. That is, the induced currents generated in the first housing and the second housing have phases opposite to each other and hence mutually cancel one another. The cancelled current components are components which contribute to a vertically polarized wave component serving as a main polarized wave at the time when data communication is performed in the state where the housings are opened.

Meanwhile, the polarization surface of vertically polarized waves is mainly used as the polarization surface of the base station antenna for portable communication. That is, the above described current line segments which are cancelled by each other are the main polarized wave components at the time when data communication is performed in the state where the housings are slidably opened. When the main polarized wave components are reduced, it is not possible to secure excellent communication quality.

An object of the present invention is to solve the above described problem and to secure excellent communication quality in a short-side direction slide type radio apparatus.

Note that unlike the conventional vertically sliding type portable radio apparatus, very excellent antenna characteristics are obtained, as the free space characteristics, in the vicinity of the antenna at the time when the housings are laterally slidably opened, because the first housing, which is regarded as a ground conductor when viewed from the antenna, does not exist in the vicinity of the antenna.

Means for Solving the Problems

The present invention is devised in order to solve the above described problem of the short-side direction slide type radio apparatus, and includes: a first housing; a second housing, conductive members which are respectively included in the first and second housings; an antenna which is configured by arranging a radiation element in the second housing along the short-side direction of the housing; a slide mechanism section which connects the first housing to the second housing slidably relative to each other; an antenna feeding point which is arranged in the second housing at an end side in the sliding direction of the first housing at the time when the housings are slidably opened; and a reactance element which connects the slide mechanism section to the conductive member included in one of the first housing and the second housing.

According to an aspect of the present invention, there is provided a short-side direction slide type radio apparatus which has a first housing and a second housing that are made slidable relative to each other in the short-side direction of the housing, and which is featured by including: first and second conductive members which are respectively provided in the first housing and the second housing; an antenna which is configured by arranging a radiation element in the second housing along the short-side direction of the second housing; a slide mechanism section which connects the first housing to the second housing slidably relative to each other; and a reactance element which connects the slide mechanism section to one of the first conductive member and the second conductive member that are respectively provided in the first housing and the second housing.

It is preferred that, in the state where the first housing and the second housing are opened by being slid relative to each other in the short-side direction of the housing, the slide mechanism section is connected to at least one of the first and second conductive members by the reactance element, and is DC connected to the conductive member which is not connected by the reactance element. It is preferred that the slide mechanism section is connected to at least one of the first and second conductive members by the reactance element so that the induced current generated in the first conductive member and the induced current generated in the second conductive member are in phase with each other. It is also preferred that the characteristics of the reactance element are adjusted so that the phase of the induced current on the side of the first housing is adjusted to be the same as the phase of the induced current on the side of the first housing.

It is preferred that the current induced in the first housing is set substantially in phase with the induced current in such a manner that the phase of the current induced in the first housing is advanced or delayed by about $\pi/2$ by adjusting the characteristic value of the reactance element of the joining section nearest to the antenna feeding point so as to set the phase of the current induced in the first housing to the same direction as the induced current. Thereby, it is possible to reduce the components which are cancelled by each other. Therefore, the total sum of the induced currents is made to have substantially the same direction as the sliding direction, so as to contribute to the radiation of vertically polarized wave components at the time of slidable opening of the housings, that is, at the time of data communication.

It is preferred that the short-side direction length of the first housing is set to about $\lambda/4$ of at least one frequency band used for communication.

Advantages of the Invention

According to the present invention, the phase of the induced current generated in the first housing can be controlled by the reactance element so as to become substantially equal to the phase of the induced current generated in the second housing. Thereby, it is possible to improve the communication quality at the time of data communication when the housings are slidably opened.

BRIEF DESCRIPTION OF THE DRAWINGS

FIG. 3 is a table showing gain values on the polarization surface in the state of data communication at the time of slidable opening of the housings.

FIG. 4 is an equivalent circuit diagram of a parallel resonant circuit filter (FIG. 4(a)) and a series resonant circuit filter (FIG. 4(b)).

DESCRIPTION OF SYMBOLS

Figure 1A:
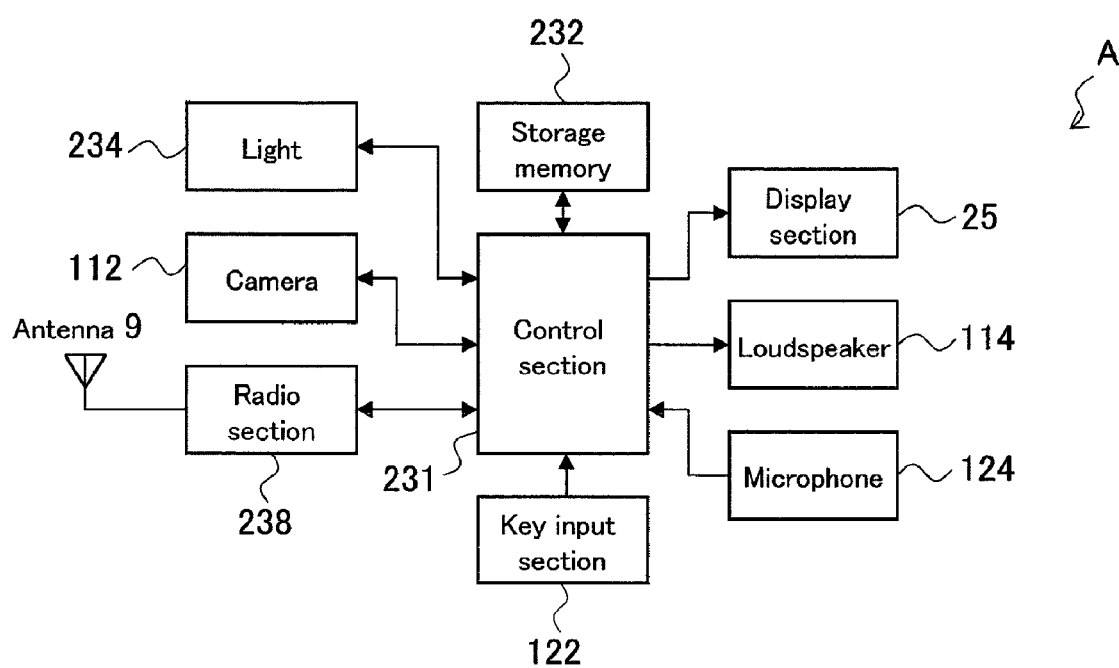
FIG. 1A is a functional block diagram showing a basic configuration example of a short-side direction slide type portable radio apparatus according to a first embodiment of the present invention.

1 First housing (display side housing)
1a First conductive circuit board
3 Second housing (operation side housing)
3a Second conductive circuit board
S Slide mechanism section
4n Reactance element
6 Antenna feeding point
9 Antenna
11a Induced current (1) on first housing (component which cancels induced current on second housing)
11b Induced current (2) on first housing (component which does not cancel induced current on second housing)
15 Small slide plate
17 Large slide plate
21a, 21b Induced current on second housing
25 Display section (such as LCD)
28a Total sum of induced currents 11a and 21a
28b Total sum of induced currents 11b and 21b
31 to 34 Joining section between slide mechanism section S and second housing 3
41 to 44 Reactance elements corresponding to joining sections 31 to 34
51 Reception section
52 Transmission section
122 Operation section (key input section)

DETAILED DESCRIPTION OF THE INVENTION

In the following, a short-side direction slide type radio apparatus according to an embodiment of the present invention will be described by using, as an example, a short-side direction slide type portable radio apparatus with reference to the accompanying drawings. In the following, in this specification, for convenience of explanation, the first housing is referred to as a display side housing (housing in which a large display section is mainly provided), and the second housing is referred to as an operation side housing (housing in which a number of operation keys are mainly arranged). Further, the first housing and the second housing are respectively referred to as the display side housing (first housing) and the operation side housing (second housing), including conductive members (such as printed boards) which configure the housings or which are included in the housings. It is assumed that an antenna is arranged at the operation side housing. It is assumed that the slide mechanism section is configured by a large and small plates, that the large slide plate (first slide plate) is fixed to the display side housing and the small slide plate (second slide plate) is fixed to the operation side housing, and that the large and small slide plates are made conductive to each other in terms of DC by a spring, or the like, for assisting the sliding operation between the plates. It is assumed that the slide mechanism section is DC connected to the display side housing. Further, it is assumed that the slide mechanism section is connected to the operation side housing via a reactive element. In the following, the description will be given by using the above described configuration as an example.

The arrangement of the respective members are exemplarily defined as described above, but the present invention is not limited to this. The antenna may be arranged at the display side housing. Further, the reactance element is assumed to be arranged at the connecting section between the operation side housing and the slide mechanism section, but the reactance element may also be arranged at the connecting section between the display side housing and the slide mechanism section.

First Embodiment

Figure 1B:
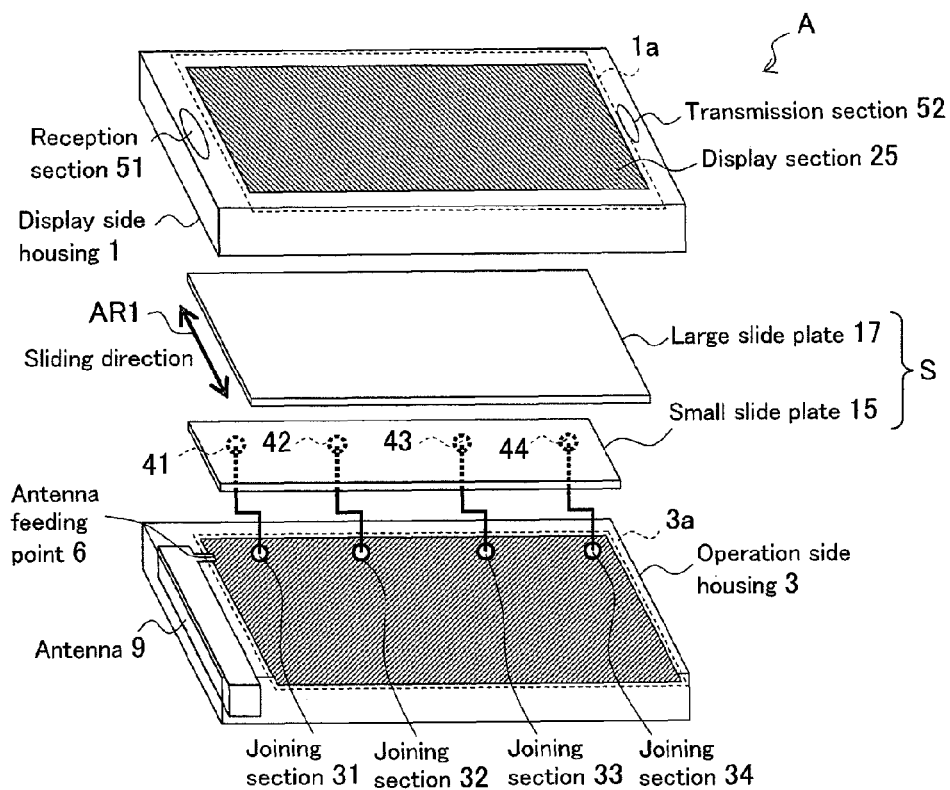
FIG. 1B is an exploded perspective view of the short-side direction slide type portable radio apparatus according to the first embodiment of the present invention.

FIG. 1A is a functional block diagram showing a basic configuration example of a short-side direction slide type portable radio apparatus according to the present embodiment. FIG. 1B is an exploded perspective view of the short-side direction slide type portable radio apparatus. As shown in FIG. 1A, a portable telephone A includes an antenna 9 for performing radio communication, a radio section 238, a control section (CPU) 231, and a storage memory 232. In addition, the portable telephone A may include a camera 112, a loudspeaker 114, a microphone 124, a light 234, and the like.

Also as shown in the external configuration in FIG. 1B, the short-side direction slide type portable radio apparatus A includes a display side housing (first housing) 1 and an operation side housing (second housing) 3. A first conductive circuit board 1a and a second conductive circuit board (ground conductor) 3a are provided in the display side housing 1 and the operation side housing 3, respectively. A drive circuit of the display section and various circuits of the communication section, and the like, are respectively integrated in these conductive circuit boards (first and second conductive circuit members) 1a and 3a. However, the configuration of these circuit boards is known, and hence the detailed explanation thereof is omitted here.

Figure 1C:
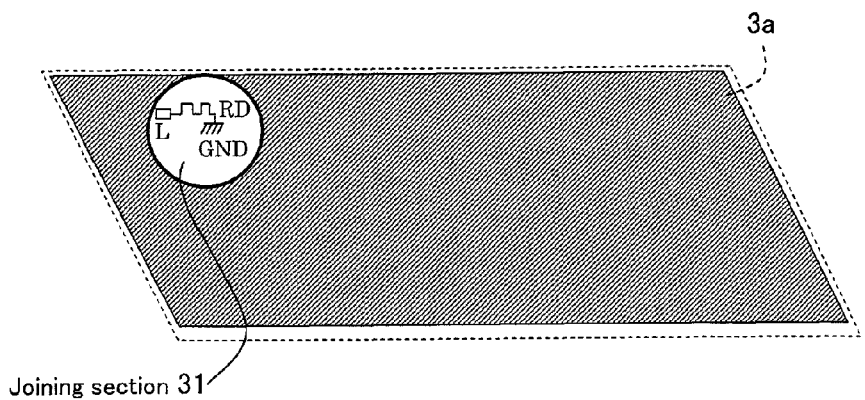
FIG. 1C is a view showing in detail a configuration near a joining section.

At the side end section of the operation side housing 3, there are provided the antenna 9 which is arranged along the short-side direction of the housing, the display side housing 1, and a slide mechanism section S which connects the display side housing 1 to the operation side housing 3 slidably relative to each other in the short-side direction of the housing. The slide mechanism S is configured so that a large slide plate 17 and a small slide plate 15 are arranged between the display side housing 1 and the operation side housing 3 in this order from the side of the display side housing 1 so as to be slid relative to each other. The small slide plate 15 is electrically connected to the conductive circuit board 3a on the operation side, and an electrode pattern for connection with the small slide plate 15 is provided on the conductive circuit board 3a. The small slide plate 15 and the electrode pattern may be brought into direct contact with each other. Alternatively, a spring, or the like, may be mounted to the electrode pattern so as to be brought into contact with the small slide plate 15. Note that the electrode pattern provided on the conductive circuit board 3a on the operation side is electrically separated from a GND pattern on the conductive circuit board 3a, and a reactance element RD is mounted between a connection electrode pattern L and the GND pattern as shown in FIG. 1C. In the following, the above described electrode for connecting the small slide plate 15 to the conductive circuit board 3a, and the reactance element are collectively referred to as a joining section.

Further, in the direction (long-side direction) which intersects the sliding direction AR1, one or more joining sections are arranged, and four joining sections 31 to 34 are illustrated in FIG. 1B.

In the following, the reactance element mounted in the joining section 31 is denoted by reference numeral 41, and the reactance element mounted in a joining section 3n is denoted by reference character 4n. In this way, the operation side housing 3 and the display side housing 1 are connected to each other in terms of high frequency via the joining sections 31 to 34.

Further, an antenna feeding point 6 which supplies electric power to the antenna 9 is arranged on the side of the slide joining section in the short-side direction of the operation side housing 3. An operation section (key input section) 122 including keyboard buttons, direction keys, and the like, is provided at the operation side housing 3. A display section 25 such as an LCD, a reception section 51 (loudspeaker 114 in FIG. 1A) used for speech communication, or the like, a transmission section 52 (microphone 124 in FIG. 1A), and the like, are provided at the display side housing 1.

In the holding state of the portable radio apparatus at the time of data communication, when the display side housing 1 and the operation side housing 3 are slidably opened, the both ends of the operation side housing 3 are generally held by both hands while the display side housing 1 is held on the upper side. In this state, the display section 25 is set to be inclined about 45 degrees with respect to the ground surface in many cases, and hence this state is defined as the state of the portable radio apparatus at the time of data communication. The conductive circuit board 3a is provided on almost the whole surface of the operation side housing 3 except for the antenna 9.

Figure 2:
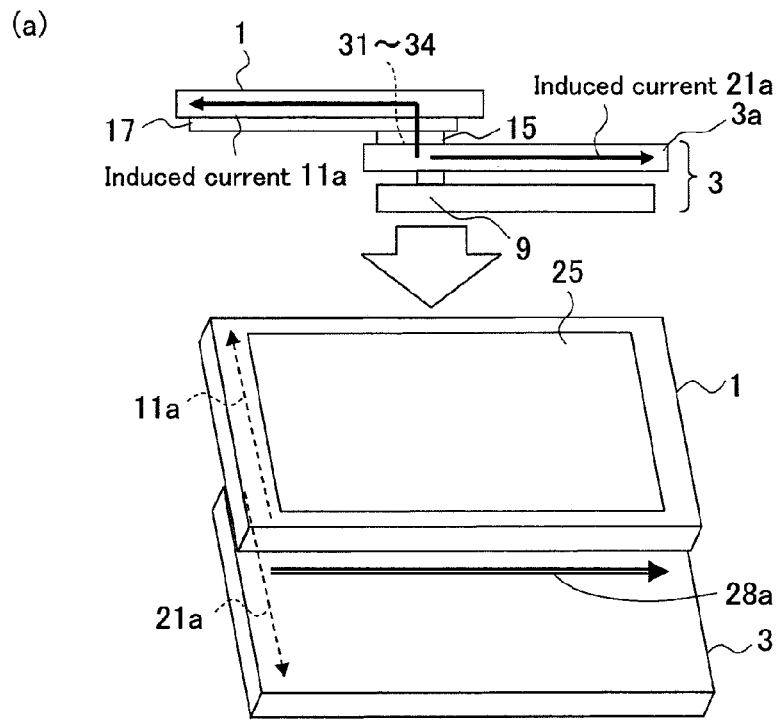
FIG. 2 is a view showing a cross-sectional configuration along the sliding direction in FIG. 1B.
Figure 2:
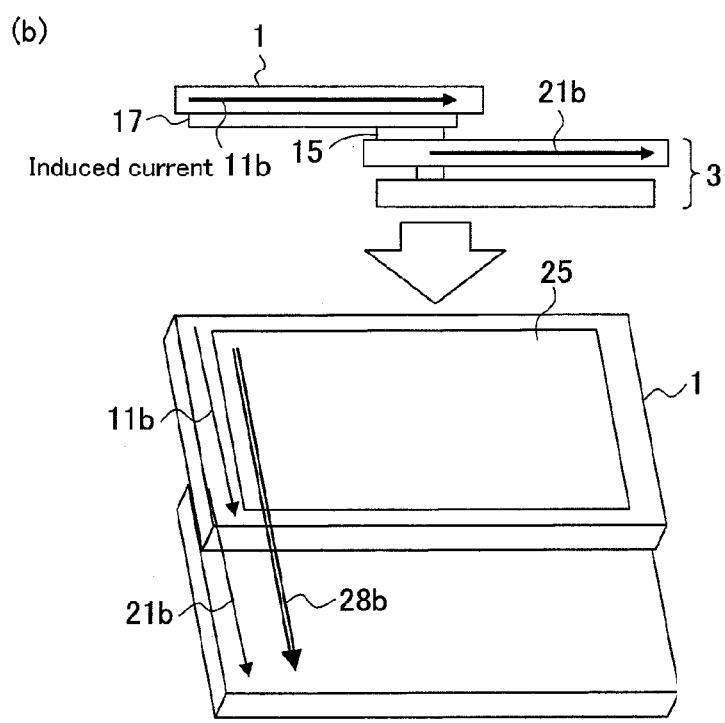

FIG. 2 is a view showing a cross-sectional configuration along the sliding direction in FIG. 1. FIG. 2(a) is a view showing an image of induced currents which are generated in the respective housings at the time when the reactance element nearest to the antenna feeding point 6 (on the depth side of which, for example, a plurality of reactance elements may be arranged) is short-circuited in the joining section(s) 31 (to 34). In the figure, under the conductive circuit board 3a, the antenna 9 is arranged via the antenna feeding point 6.

The above described state is equivalent to the state where the display side housing 1 and the operation side housing 3 are mechanically and conductively connected to each other.

Induced current 11a represents the current induced in the display side housing 1, and induced current 21a represents the current induced in the operation side housing 3. Induced current 28a is the total sum of the currents induced in the display side housing 1 and the operation side housing 3, and graphically represents an image of the current distribution which is a main cause of radiation.

FIG. 2(b) is a view showing an image of induced current 11b whose phase is made substantially equal to the phase of the induced current 21a in such a manner that the phase of the induced current 11a in the state shown in FIG. 2(a) is adjusted by adjusting the characteristics of the reactance elements provided at the joining sections 31 to 34. Induced current 28b represents an image of the total sum of the induced current 11b and induced current 21b.

For example, the large slide plate 17 also serves as a housing cover of the display side housing 1, and is conductive to the conductive circuit board 1a on the display side in terms of DC when the apparatus A is assembled. When the large slide plate 17 does not serve as the housing cover in another configuration example, the large slide plate 17 may be configured to be DC connected by a known method to the conductive circuit board 1a or to a conductive component which configures the housing cover.

The state shown in FIG. 2(a) is the state of current distribution which is described in relation to the above described problem to be solved, and in which the induced current 11a and the induced current 21a respectively flow in the directions opposite to each other so as to be cancelled by each other. Therefore, the main component of the total sum of the induced currents becomes as shown by the induced current 28a, so that the polarized wave in the long-side direction of the housing serves as a main polarized wave. As described in the above described problem to be solved, the induced current 28a is emission current which contributes to the horizontally polarized wave component at the time of data communication, when the housings are slidably opened. Thus, the induced current 28a is orthogonal to, for example, incoming waves from a base station, so as to cause a problem that, even when the antenna characteristics are excellent in free space, the reception sensitivity is deteriorated in the actual use condition.

Thus, the phase of the current induced in the first housing 1 can be made to correspond to the direction of the induced current 11b as shown in FIG. 2(b), in such a manner that the characteristic values of the reactance element of the joining section 31 nearest to the antenna feeding point 6 are adjusted so as to make the phase of the induced current 11 of the housing 1 advanced or delayed by about $\pi/2$ from the state shown in FIG. 2(a). Thereby, the phase of the current induced in the first housing 1 can be made substantially equal to the phase of the induced current 21b, so that it is possible to reduce the components which are cancelled by each other. Therefore, the total sum of the induced current 11b and the induced current 21b becomes to have a direction substantially equal to the sliding direction AR1 as shown by the induced current 28b, and contributes to the radiation of the vertically polarized wave component at the time when the housings are slidably opened, that is, at the time of data communication.

FIG. 3 is a table showing the gain values in the vertical plane and the gain values in the horizontal plane at the time when the housings are slidably opened. When the state shown in FIG. 2(b) is continued, as shown in FIG. 3, the gain values for vertically polarized waves in the state of data communication at the time when the housings are slidably opened are significantly improved in the 2 GHz band (about 1.9 GHz to 2.1 GHz) used in radio communication. That is, it can be seen that the gain values for the vertically polarized waves can be improved in the respective communication frequency bands in such a manner that the reactance elements are respectively provided at the joining sections 31 to 34 so as to make each of the joining sections 31 to 34 connected with a load.

Note that it is difficult to systematically analyze the induced current 11a generated on the side of the first housing because the induced current 11a is complicatedly influenced by various factors, such as the electrostatic capacitance determined by the area and the gap between the first housing 1 and the second housing 3 which are overlapped with each other at the time of slidable opening of the housings, the configuration of the slide mechanism section S, the shape and length of a metal component which allows the current to flow, and the positional relationship between the metal component and the antenna. Thus, the adjusting range of reactance elements 41 to 44 is set so that the reactance elements can take all the values including the values in the short-circuited and opened states. Further, each of the reactance elements 41 to 44 respectively arranged at the joining sections 31 to 34 can also take a different value.

Second Embodiment

Figures 5, 6:
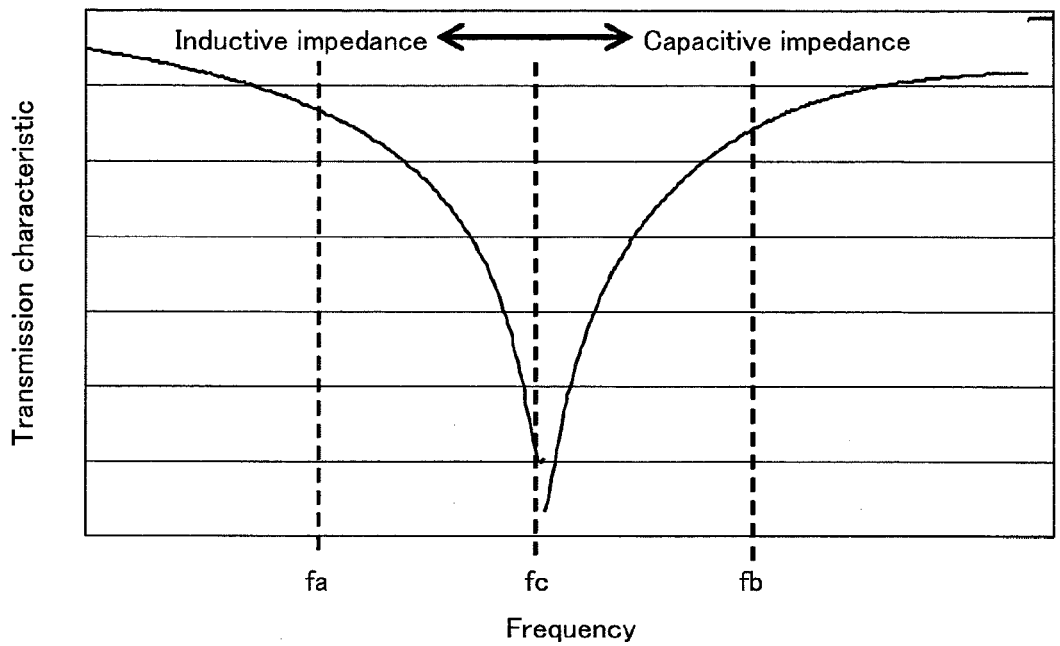
FIG. 5 is a view showing a configuration example of a short-side direction slide type portable radio apparatus according to a second embodiment of the present invention.
FIG. 6 is a table showing gain values of vertically polarized waves in the state of data communication at the time of slidable opening of the housings.

Next, a communication technique according to a second embodiment of the present invention will be described with reference to FIG. 4 and FIG. 5. In the above described first embodiment, the single band configuration of 2 GHz band is described, but according to the present invention, the same effect can also be obtained even in the case corresponding to a multi-band. In the case where a plurality of radio communication frequency bands are used in the radio apparatus, and where the first use (communication) frequency band fa of the lower frequency side and the second use (communication) frequency band fb of the higher frequency side are relatively separated from each other, a value of a reactance element 4, which is optimum for the frequency band fa, and a value of the reactance element 4, which is optimum for the frequency band fb, may be different from each other.

At present, the frequency bands mainly used as the frequency bands for portable radio apparatuses are the 800 MHz band, the 900 MHz band, the 1.7 GHz band, the 1.8 GHz band, the 1.9 GHz band, and the 2 GHz band. Here, when the 800 MHz band and the 900 MHz band are set as the first frequency band fa, and when the respective adjoining frequency bands from the 1.7 GHz band to the 2 GHz band are set as the second frequency band fb, the relationship between the frequency bands fa and fb is approximately expressed as fb≈2fa.

Further, as for approximate dimensions of a most popular portable radio apparatus, the dimension in the housing short-side direction is about λb/4 of the wavelength λb corresponding to fb, that is, 40 to 50 mm, and the dimension in the housing long-side direction is about λa/4 of the wavelength λa corresponding to fa, that is, 85 to 95 mm. When the induced current distribution at the time of slidable opening of the housings is considered in relation to the first frequency band fa, the induced current is mainly generated in the housing long-side direction in which the housing dimension is λa/4. At this time, when at least one of the reactance elements 41 to 44 is adjusted in matching with fa, it is possible to obtain the radiation characteristics in which the total sliding direction length of the first and second housings is about λa/2, that is, the radiation characteristics in which the vertical polarized wave components are close to those of one quarter wavelength (λ/4) dipole.

At this time, the values of the reactance elements 41 to 44, which are optimum for the frequency band fa, are different from the values of the reactance elements 41 to 44, which are optimum for the frequency band fb. However, the values of the reactance elements can be simultaneously adjusted for different frequency bands according to the configuration of the reactance elements.

The configuration of the reactance element will be exemplarily described by using a LC filter having a simplest configuration with reference to FIGS. 4(a) and (b). FIG. 4(a) shows a parallel resonant circuit filter which has a cut-off frequency of fc and in which a coil and a capacitor are equivalently connected in parallel to each other. When the parallel resonant circuit filter is configured so that the reactance of the coil and the reactance of the capacitor act synergistically together at the resonance point so as to cause the resonance impedance of the circuit to become infinity ($\infty$) at the resonance point, and when the frequency bands fa and fb, and the cut-off frequency fc are set as fa<fc<fb, it is possible that an inductive parallel resonant circuit filter is connected in the frequency band fa, and that a capacitive parallel resonant circuit filter is connected in the frequency band fb. Further, FIG. 4(b) shows a series resonant circuit filter which has the cut-off frequency of fc and in which a coil and a capacitor are equivalently connected in series to each other. When the series resonant circuit filter is configured so that the reactance of the coil and the reactance of the capacitor act synergistically together at the resonance point so as to cause the resonance impedance of the circuit to become zero at the resonance point (to cause a notch), it is also possible, with respect to the notch, that a capacitive series resonant circuit filter is connected in the frequency band fa, and that an inductive series resonant circuit filter is connected in the frequency band fb.

That is, when frequency bands corresponding to a multi-band antenna are separated from each other by about twice one of the frequency bands, the values of the reactance element 41 which are optimum to the respective frequency bands (frequency bands of fa and fb in the present embodiment) are different from each other, and the range of the optimum reactance value is also different for each of the frequency bands. However, when the reactance element is configured as shown in FIGS. 4(a) and 4(b), the reactance value of the reactance element can be optimally adjusted in the respective frequency bands.

For example, an example of a multi-band antenna, in which the frequency band fa is set to the 900 MHz band and the frequency band fb is set to the 2 GHz band, will be described in the following. FIG. 6 shows the gain values for vertically polarized waves in the 900 MHz band and the 2 GHz band in the cases where the reactance element 41 is respectively adjusted to 1) 4.0 pF, 2) 1.5 nH, and 3) about 4.0 pF in the 900 MHz band and about 1.5 pF in the 2 GHz band in the element configuration shown in FIG. 4(a). As shown in FIG. 6, the gain values in the 900 MHz band are high in the cases of 1) and 3), and the gain values in the 2 GHz band are high in the cases of 2) and 3). That is, it can be seen that the gain values for vertically polarized waves in the 900 MHz band and the 2 GHz band in the state of data communication at the time of slidable opening of the housings are improved by the reactance element 41.

In addition, the phase of the induced current generated on the display side housing can be adjusted by configuring the reactance element 41 as a phase shifter, such as a dielectric filter, a π-type filter and a T-type filter.

Further, it is also possible that reactance elements 4a and 4b respectively corresponding to the frequency bands fa and fb are prepared so as to be switched by an RFSW, or the like, in correspondence with the use frequency band.

Third Embodiment

Figure 7:
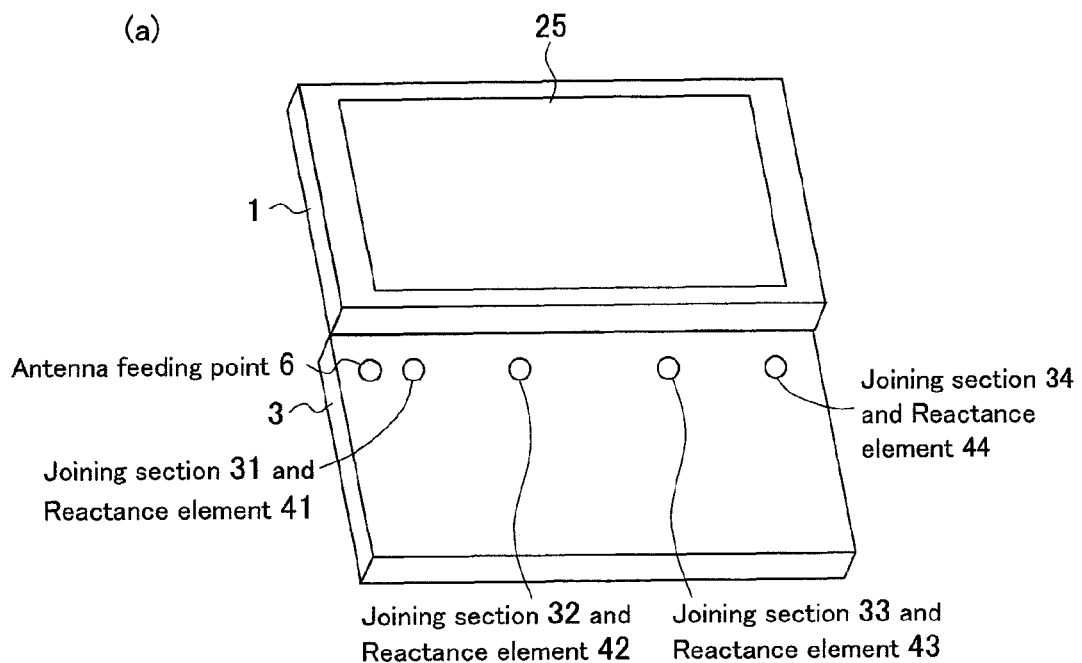
FIG. 7 is a view which shows a short-side direction slide type portable radio apparatus according to a third embodiment of the present invention, and which shows a configuration having a plurality of reactance elements that are respectively provided at a plurality of joining sections arranged in the lateral direction (direction orthogonal to the sliding direction) from an antenna feeding point.
Figure 7:
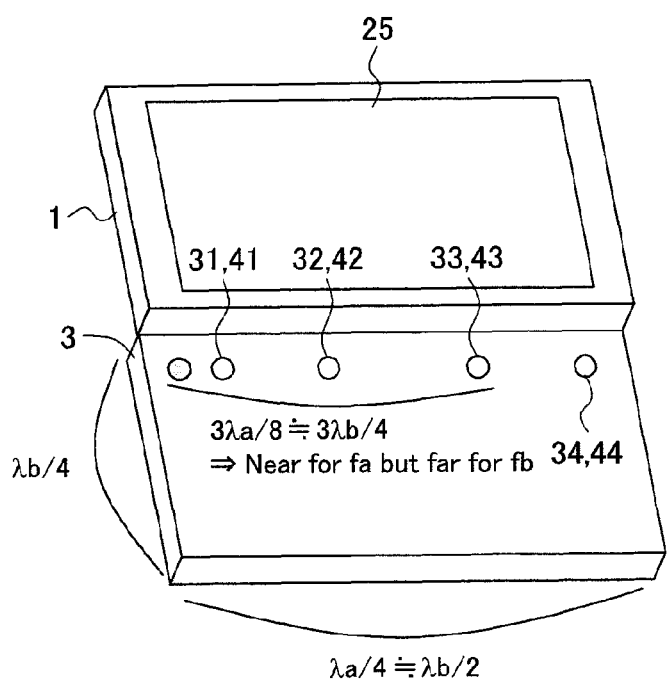

Next, a communication technique according to a third embodiment of the present invention will be described with reference to accompanying drawings. In the second embodiment, the example in which the current control of the multi-band antenna is performed only by the reactance element 41 is described. However, in the present embodiment, an example will be described in which the current control in the multi-band antenna is performed by a configuration where a plurality of joining sections (joining sections 32, 33 and 34 in the figure) are provided from the antenna feeding point 6 along the longitudinal direction of the housing and where reactance elements 42, 43 and 44 are respectively provided at the joining sections 32, 33 and 34. FIG. 7 is a view showing a configuration example of a short-side direction slide type portable radio apparatus according to the present embodiment.

When the induced current generated on the housing is controlled, the distance between the reactance element and the antenna feeding point on the path through which the induced current flows becomes important. When the reactance element and the antenna feeding point are close to each other, the phase change of the current until the current reaches the reactance element after being generated is small, and hence the distribution of the impedance depending on the current is narrow. This makes it possible to control the phase of the current in a wide range. On the contrary, when the reactance element and the antenna feeding point are away from each other, the phase of the current is changed until the current reaches the reactance element after being generated, and hence the distribution of the impedance depending on the current is widened. This makes it impossible to achieve the intended control of the phase of the current.

That is, as shown in FIG. 7, in the case of the above described short-side direction slide type portable radio apparatus according to the second embodiment, which is configured so that the first frequency band represented by fa and the second frequency band represented by fb are separated by a frequency range denoted approximately as fb≈2fa, the short-side direction length of the housing is about λb/4, and the long-side direction length of the housing is about λa/4≈λb/2. At this time, as shown in FIG. 7(b), the reactance element 43 is located at a position third nearest to the antenna feeding point 6. That is, the reactance element 43 is arranged at a position separated by about 3λa/16 (shorter than λa/4) for the frequency band fa, and hence is arranged at a near position for the wavelength λa. Further, the reactance element 43 is arranged at a position separated by about 3λb/8 (longer than λb/4) for the frequency band fb, and hence is arranged at a distant position for the wavelength λb.

With the above described configuration, the reactance element 43 can be made to effectively operate in the frequency band fa, but is prevented from effectively operating in the frequency band fb. As a result, the reactance element 43 can be utilized only for the adjustment relating to the frequency band fa.

Note that in the case of a long-side direction slide type portable radio apparatus in which the housings are slid relative to each other in the long-side direction of the housing, the sliding direction is orthogonal to the short-side direction of the portable radio apparatus, and hence the degree of freedom regarding the arrangement of the reactance element tends to be reduced, so that the effect obtained by adjusting the arrangement position of the reactance element with respect to the antenna feeding point is reduced as compared with the case of the short-side direction slide type portable radio apparatus. That is, in the case of the short-side direction slide type portable radio apparatus according to the present embodiment, the sliding direction and the long-side direction of the housing of the radio apparatus are orthogonal to each other, and hence the adjustment only in a desired frequency band can be effectively performed in dependence upon a place at which the reactance element is arranged.

SUMMARY

In the short-side direction slide type portable radio apparatus according to the embodiments of the present invention, the reactance element, which connects the slide mechanism section for sliding the first housing and the second housing relative to each other, to the conductive member provided in one of the first housing and the second housing, is provided, and the induced current generated in the first housing is controlled by the reactance element so as to have substantially the same phase as the phase of the induced current generated in the second housing. Thereby, it is possible to improve the communication quality at the time of data communication in the state where the housings are slidably opened. Note that the above described embodiments are described by taking the portable radio apparatus as an example, but the present invention can also be applied to a stationary radio apparatus. This case is also included in the scope of the present invention.

INDUSTRIAL APPLICABILITY

The present invention can be utilized for a short-side direction slide type radio apparatus.

The invention claimed is:

1. A short-side direction slide type radio apparatus having a first housing and a second housing that are slid relative to each other in the short-side direction of the housing, the radio apparatus comprising:
   a first conductive member which is provided in the first housing;
   a second conductive member which is provided in the second housing;
   an antenna which is configured by arranging a radiation element in the second housing along the short-side direction of the second housing;
   a slide mechanism section which connects the first housing to the second housing slidably relative to each other;
   an antenna feeding point which is arranged in the second housing at an end side in the sliding direction of the first housing at the time when the housings are slidably opened; and
   a reactance element which is provided at at least one of the first and second conductive members,
   wherein the slide mechanism section and the reactance element are connected in series to each other on a path which electrically connects the first conductive member to the second conductive member.

2. The short-side direction slide type radio apparatus according to claim 1,
   wherein in the state where the first housing and the second housing are opened by being slid relative to each other in the short-side direction, the slide mechanism section is connected to at least one of the first and second conductive members by the reactance element, and is DC connected to the conductive member which is not connected by the reactance element.

3. The short-side direction slide type radio apparatus according to claim 2,
   wherein the slide mechanism section is connected to at least one of the first and second conductive members by the reactance element so that induced current generated in the first conductive member and induced current generated in the second conductive member are set in phase with each other.

4. The short-side direction slide type radio apparatus according to claim 2, wherein the characteristic of the reactance element is adjusted so that the phase of the induced current on the side of the first housing is adjusted to be the same as the phase of the induced current on the side of the first housing.

5. The short-side direction slide type radio apparatus according to claim 2, wherein the short-side direction length of the first housing is set to about one fourth of the wavelength ($\lambda/4$) of at least a frequency band used for communication.

6. The short-side direction slide type radio apparatus according to claim 1,
   wherein the slide mechanism section is connected to at least one of the first and second conductive members by the reactance element so that induced current generated in the first conductive member and induced current generated in the second conductive member are set in phase with each other.

7. The short-side direction slide type radio apparatus according to claim 6, wherein the current induced in the first housing is set to be substantially in phase with the induced current in such a manner that the phase of the current induced in the first housing is advanced or delayed by about $\pi/2$ by adjusting the characteristic value of the reactance element of the joining section nearest to the antenna feeding point so as to set the phase of the current induced in the first housing to the same direction as the induced current.

8. The short-side direction slide type radio apparatus according to claim 7, wherein the characteristic of the reactance element is adjusted so that the phase of the induced current on the side of the first housing is adjusted to be the same as the phase of the induced current on the side of the first housing.

9. The short-side direction slide type radio apparatus according to claim 7, wherein the short-side direction length of the first housing is set to about one fourth of the wavelength ($\lambda/4$) of at least a frequency band used for communication.

10. The short-side direction slide type radio apparatus according to claim 6, wherein the characteristic of the reactance element is adjusted so that the phase of the induced current on the side of the first housing is adjusted to be the same as the phase of the induced current on the side of the first housing.

11. The short-side direction slide type radio apparatus according to claim 6, wherein the short-side direction length of the first housing is set to about one fourth of the wavelength ($\lambda/4$) of at least a frequency band used for communication.

12. The short-side direction slide type radio apparatus according to claim 1, wherein the characteristic of the reactance element is adjusted so that the phase of the induced current on the side of the first housing is adjusted to be the same as the phase of the induced current on the side of the second housing.

13. The short-side direction slide type radio apparatus according to claim 12, wherein the short-side direction length of the first housing is set to about one fourth of the wavelength ($\lambda/4$) of at least a frequency band used for communication.

14. The short-side direction slide type radio apparatus according to claim 1, wherein the short-side direction length of the first housing is set to about one fourth of the wavelength (λ/4) of at least a frequency band used for communication.

15. The short-side direction slide type radio apparatus according to claim 1, wherein the slide mechanism section is provided separately from the first and second conductive member.

16. The short-side direction slide type radio apparatus according to claim 1, wherein the slide mechanism has a first slide plate attached to the first housing, and the second slide plate that slides with respect to the first slide plate, and the reactance element is connected to at least one of the first slide plate and the second slide plate.

* * * * *